United States Patent [19]

Bell

[11] 3,813,757

[45] June 4, 1974

[54] METHOD OF COATING A VACUUM BOTTLE

[75] Inventor: Vernon D. Bell, Westerly, R.I.

[73] Assignee: King-Seeley Thermos Co., Norwich, Conn.

[22] Filed: Sept. 1, 1971

[21] Appl. No.: 176,975

[52] U.S. Cl. .................. 29/455, 29/460, 117/21, 117/95, 117/97, 215/13 R, 220/96
[51] Int. Cl. .................. B44d 1/094, A47j 41/02
[58] Field of Search .................. 117/21, 97, 95, 18; 215/13 R; 29/466, 455; 270/9 C

[56] References Cited
UNITED STATES PATENTS

| | | | |
|---|---|---|---|
| 1,880,358 | 10/1932 | Payson et al. | 215/13 |
| 2,643,021 | 6/1953 | Freedman | 215/13 |
| 3,016,159 | 1/1962 | Bramming | 215/13 |
| 3,207,358 | 9/1965 | Fliss | 117/21 |
| 3,291,631 | 12/1966 | Smith | 117/21 |
| 3,258,147 | 6/1966 | Rownd | 215/13 |

Primary Examiner—William D. Martin
Assistant Examiner—William R. Trenor
Attorney, Agent, or Firm—Harness, Dickey & Pierce

[57] ABSTRACT

A vacuum bottle having a plastic coated or lined vacuum filler unit and method of lining such a vacuum filler. In connection with the method of lining the filler, before the filler is evacuated it is heated and a granular or powdered thermoplastic material is placed on the surface that is to be lined. The filler is then evacuated and sealed so that its heated walls will retain the heat sufficiently to insure good fusion of the plastic coating.

4 Claims, 4 Drawing Figures

PATENTED JUN 4 1974
3,813,757
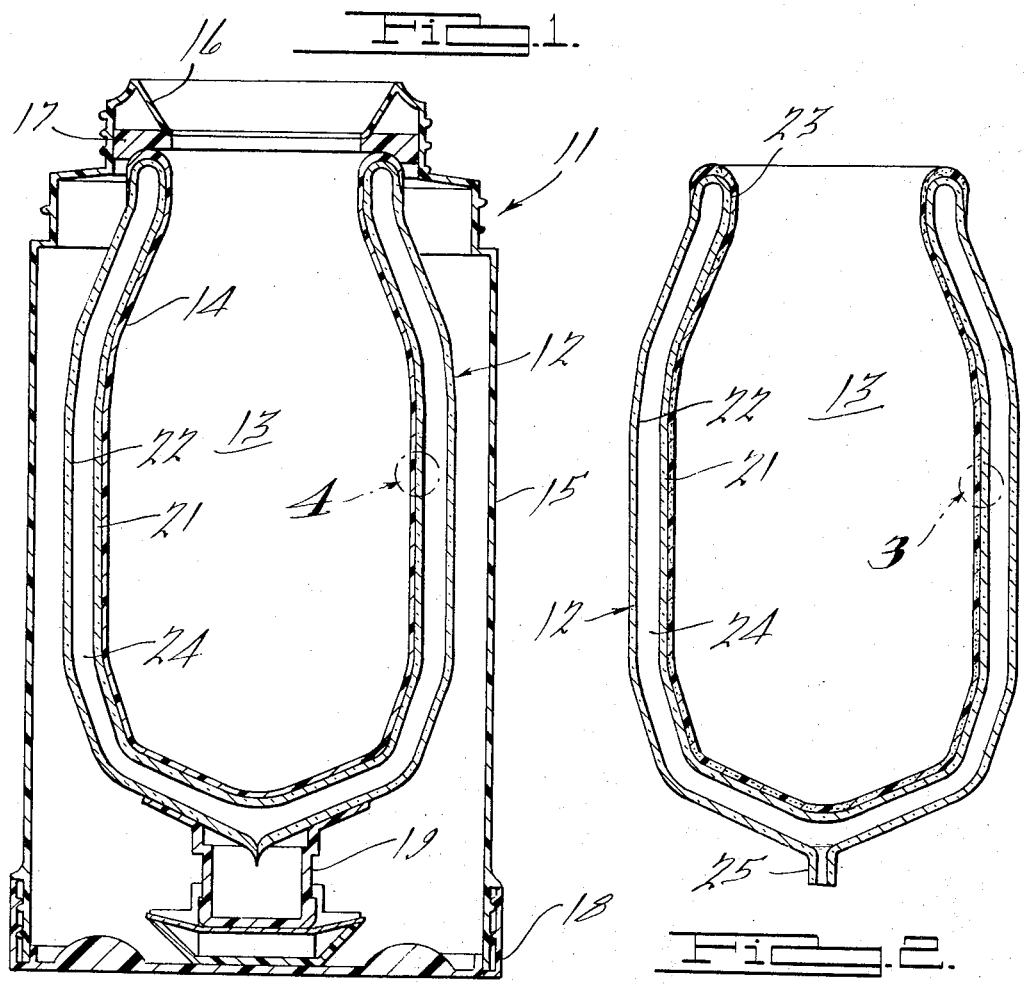
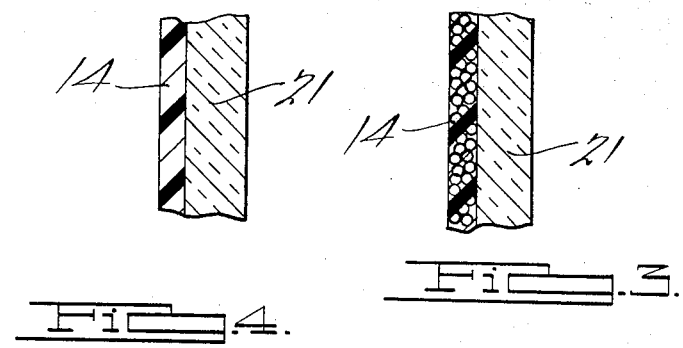
INVENTOR.
Vernon D. Bell
BY
Harness, Dickey & Pierce
ATTORNEYS.

METHOD OF COATING A VACUUM BOTTLE

BACKGROUND OF THE INVENTION

This invention relates to a vacuum bottle and more particularly to an improved method for coating a vacuum bottle.

Vacuum bottles normally employ a glass walled evacuated filler for insulating purposes. Normally the evacuated filler also forms the space in which the material to be insulated is positioned. There are certain advantages to the lining of the walls of the evacuated filler particularly the interior to insure against breakage. Various methods have been proposed for placing such linings in the vacuum fillers. Blow molding has been suggested but this is an expensive process and has other defects. Articles may be coated with a plastic material by placing a thermoplastic powder on the surface of the article to be coated and by applying sufficient heat so as to melt the coated material and to form a good surface bond with the substrate. Such a method is difficult to accomplish in connection with a vacuum bottle due to its inherent good insulating properties which makes the application of sufficient heat almost impossible.

It is, therefore, a principal object of this invention to provide an improved method of lining or coating the surface of a vacuum bottle.

It is a further object of the invention to provide a method for forming a coated vacuum bottle wherein the coating is applied by a fusion process.

SUMMARY OF THE INVENTION

This invention is adapted to be embodied in a method for forming a coated vacuum bottle. In this method a double wall vessel is formed with a space between its walls. A granular thermoplastic coating material is applied to at least one area of the vessel and the vessel is heated to a temperature sufficient to fuse the plastic coated material. The space between the walls is then evacuated and sealed for retaining the heat to continue the fusion of the coating after evacuation.

BRIEF DESCRIPTION OF THE DRAWINGS

FIG. 1 is a longitudinal cross sectional view taken through a vacuum bottle embodying a vacuum filler made in accordance with this invention.

FIG. 2 is a cross sectional view of the vacuum filler during a stage in the manufacturing process.

FIG. 3 is an enlarged view of the area encompassed by the circle 3 in FIG. 2.

FIG. 4 is an enlarged view, in part similar to FIG. 3, showing the area encompassed by the circle 4 in FIG. 1.

DETAILED DESCRIPTION OF THE PREFERRED EMBODIMENT

Referring first to FIG. 1, a vacuum bottle embodying this invention is identified generally by the reference numeral 11. The vacuum bottle 11 includes a vacuum filler 12 that defines an internal space 13 in which the material to be insulated is placed. The area of the vacuum filler 12 that defines the space 13 is covered with a plastic coating 14, in a manner which will be described. The plastic coating 14 extends along the inner wall of the vacuum filler and through its open mouth and for a small portion around its outer periphery adjacent the mouth as clearly shown in FIG. 1.

The vacuum filler 12 is placed within an outer protective jacket 15 that has an open mouth 16 adjacent the upper end of the storage area 13. A gasket 17 is interposed between the upper end of the vacuum filler 12 and the upper end of the jacket 15.

A bottom closure member 18 is threaded on to the lower end of the jacket 15 and carries a combined protective and supporting assembly 19 that supportingly engages the lower end of the vacuum filler. In addition, this construction exerts a sealing pressure on the gasket 17. The assembly is completed by a stopper and cap, which elements are not shown since they may take any form as is well known in this art.

Referring now to the remaining Figures, the method of applying the coating 14 to the vacuum filler 12 will be described. The vacuum filler 12 consists of inner and outer walls 21 and 22 that are joined at their upper peripheral edges in the vicinity of a constricted neck 23 formed at the upper end of the storage space 13. A space 24 is formed between the walls 21 and 22 and a tubulation or tube 25 is formed at the lower end of the outer wall 22. When the filler 12 is initially formed the tube 25 is open to the atmosphere and, of course, the space 24 will be filled with air.

A coating of a thermoplastic material such as a high density polyethylene, for example the polyethylene of the type sold by Phillips Petroleum Company under the code designation BMN TR–980 forms the lining 14. In order to apply this lining the vacuum filler is heated to a temperature in the range of 425° to 475° fahrenheit. This heating step is normally used in connection with the formation of conventional vacuum fillers to perform a so called drying operation. This drying operation is used in conjunction with the silvering of the inner surface of the walls for removing the water used in the rinsing which follows the silvering operation. In addition to the removal of the water the drying heating step also promotes outgassing of the area from the space 24 during evacuation. The temperature that is actually used will depend upon the temperature at which the plastic will fuse.

The desired plastic coating material is then applied to the inner surface of the wall 21 in a powdered form. A powder having a 35 mesh has been found to be particularly useful. The coating is evenly distributed by rotating the vacuum filler or in any other suitable manner. The upper portion of the neck of the outer surface of the wall 22 adjacent the neck 23 are coated by dipping. The condition of the filler at this stage is shown in FIGS. 2 and 3 wherein the granular nature of the coating is exaggerated for the purpose of illustration.

The space 24 is then evacuated by drawing the vacuum through the tubulation 25 and by sealing it as is well known in this art. When evacuated, the filler 12 will form a well insulated assembly and the walls 21 and 22 and particularly the wall 21 will retain its heat for a considerable period of time. It has been found that at the time of evacuation the outer wall temperature will be in the range of 150° to 200° fahrenheit while the inner wall will still be at a temperature in excess of 300° fahrenheit. Of course, during this time some fusion of the lining 14 will have occurred and this fusion will continue for a period of time after evacuation. It has been found that due to the insulating properties there is sufficient time, temperature conditions for good leveling and flow of the polyethylene material and a smooth coating results. It should be obvious that if the coating were to be applied after the filler were evacuated considerable heat would have to be applied due to the good insulating properties. Thus, the disclosed method provides a good coating and is easy and inexpensive to perform.

It is to be understood that the foregoing description is that of a preferred embodiment of the invention. Various changes and modifications may be made without departing from the spirit and scope of the invention as defined by the appended claims.

I claim:

1. The method of forming a coated vacuum bottle comprising the sequential steps of forming a double walled vessel with a space between the walls, heating the vessel, applying a granular thermoplastic coating material to the area of said vessel to be coated, the vessel being heated to a temperature sufficient to fuse and level the granular thermoplastic coating material, evacuating the space between the walls, sealing the evacuated space between the walls to maintain the vacuum therebetween for retaining the heat therein to continue the fusion and leveling of the coating, and permitting the heated vessel to cool to ambient temperature.

2. The method of forming a coated vacuum bottle as set forth in claim 1 wherein the coating is applied to a space formed by the innermost of the walls.

3. The method of forming a coated vacuum bottle as set forth in claim 2 wherein the coating extends across an open mouth formed by the walls in an area where they are joined and extends for a portion of the area of the outermost wall adjacent the mouth.

4. The method of forming a coated vacuum bottle as set forth in claim 3 wherein the coating is applied to the open mouth and the adjacent surface of the outer wall by dipping the vessel into the coating material when the coating material is in the granular form.

* * * * *